UNITED STATES PATENT OFFICE.

JOHN R. DODGE, JR., OF NORMAL, ILLINOIS, ASSIGNOR OF ONE-HALF HIS RIGHT TO WILLIAM T. SHURTLEFF, OF SAME PLACE.

IMPROVEMENT IN COMPOSITIONS FOR PRESERVING, DRYING, AND BLEACHING FRUIT.

Specification forming part of Letters Patent No. 191,661, dated June 5, 1877; application filed April 14, 1877.

*To all whom it may concern:*

Be it known that I, JOHN R. DODGE, Jr., of Normal, in the county of McLean and State of Illinois, have invented a certain new and useful Compound for Preserving, Bleaching, and Drying Fruit; and I do hereby declare that the following is a full, clear, and exact description thereof.

This invention relates to that class of compounds used for preserving, bleaching, and drying fruit; and it consists in a composition of pulverized sulphur, charcoal, and alum.

My compound for this purpose is composed of five parts sulphur, four parts charcoal, and one part alum.

I do not wish, however, to confine myself to the exact proportions as above described, as they may differ to some extent, and equally good work be accomplished.

The fruit to be preserved, bleached, and dried is placed on screens, or otherwise exposed to the fumes of the burning compound, in the fruit-chamber of a drier or other chamber or vessel.

I am aware that a compound consisting of a mixture of sulphur and charcoal, designed for the same purpose, is old, and such I do not claim, broadly, as my invention; but with the additional element of alum a better result is produced, as the alum preserves the fresh appearance of the fruit longer, and also prevents the fruit from souring as readily as when only charcoal and sulphur are used.

I therefore claim as my invention—

A compound for preserving, drying, and bleaching fruit, consisting of charcoal, sulphur, and alum, substantially as described.

JOHN R. DODGE, JR.

Witnesses:
 THOS. SLADE,
 JOHN MOORE.